United States Patent [19]
Borsum et al.

[11] 3,731,955
[45] May 8, 1973

[54] PUSH-PULL CONNECTOR HAVING A SHEAR-RESISTANT LOCKING RING

[76] Inventors: Adolph W. Borsum; William K. Borsum, both of 521 Pacific Avenue, Solana Beach, Calif. 92075

[22] Filed: Sept. 24, 1971

[21] Appl. No.: 183,582

[52] U.S. Cl. .................... 285/111, 285/307, 285/321
[51] Int. Cl. ............................................. F16l 17/00
[58] Field of Search ................... 285/321, 308, 307, 285/111

[56] References Cited

UNITED STATES PATENTS

| | | | |
|---|---|---|---|
| 3,447,819 | 6/1969 | Borsum et al. | 285/321 X |
| 3,172,721 | 3/1965 | Kelly | 285/321 X |
| 3,341,227 | 9/1967 | Pierce | 285/321 X |
| 3,532,367 | 10/1970 | Roos | 285/302 |

FOREIGN PATENTS OR APPLICATIONS

| | | | |
|---|---|---|---|
| 2,030,059 | 1/1971 | Germany | 285/308 |

*Primary Examiner*—Dave W. Arola
*Attorney*—R. S. Sciascia

[57] ABSTRACT

A push-pull connector including conventional telescopically slidable male and female connector members each provided with an annular peripheral recess, the members being interlocked by a resilient U-shaped packing secured in one of the recesses and extending into an engaged position in the other recess. A disconnect ring, preferably mounted in this other recess, is slidably movable axially of the connector members to forcefully cam the packing out of its interlocking engagement to permit the connector members to be separated. Shear strength of the locking member is increased by specially forming the recess-engaging portion of the U-shaped packing. In particular, this portion is formed as a parallelogram and the arrangement is such that approximately one-half of the parallelogram projects into engagement with the other recess, the other half of the parallelogram remaining in the recess in which the packing is secured. Compressive forces produced by the normal tendency of the connector members to separate are applied in shear substantially along the diagonal of the parallelogram which, since it contains the maximum bulk of the packing, is capable of resisting the shear.

12 Claims, 19 Drawing Figures

INVENTORS.
ADOLPH W. BORSUM,
WILLIAM K. BORSUM,

INVENTORS.
ADOLPH W. BORSUM,
WILLIAM K. BORSUM,

PUSH-PULL CONNECTOR HAVING A SHEAR-RESISTANT LOCKING RING

BACKGROUND OF THE INVENTION

1. Field of the Invention

The invention relates to push-pull connectors of the type having resilient interlocking members and integrated disconnect members to unlatch the interlocking members.

2. Description of the Prior Art

The term push-pull connector presently is used to connote a class of connectors employing male and female connector members telescopically slidable one into the other, the connection automatically occurring when the two members are pushed together. A resilient locking member sometimes in the form of a U-packing provides a latch-type interlock and, to permit the interlocked members to be separated, the arrangement may employ a special disconnect means in the form of a key or ring movable relatively to the members to press the resilient packing out of its interlocked engagement. Such an arrangement is shown in our U.S. Pat. No. 3,447,819 issued June 3, 1969 "Push-Pull Connector Having Combined Seal and Locking Ring." Although the connector disclosed in this patent has proven a valuable addition to the art, it has been found that the uses of this connector are somewhat limited especially in situations in which the interlock provided by the resilient packing must resist unusually high line pressures or very high momentary pressure surges such as may occur when line fluids are rapidly turned on or off. Also, it is highly desirable to provide these connectors with a maximum sealing capacity and, when the connector member is of a type in which the interlock as well as the seal are provided with the same resilient packing, effective sealing may present some difficulty.

A further difficulty with many of the prior art connectors is that their results are achieved by relatively complex, expensive arrangements which in a number of instances have rendered them somewhat unreliable and difficult to use. Factors such as these have discouraged widespread use particularly in such fields as the coupling of household appliances or garden hoses where expense and ease of handling are significant considerations.

SUMMARY OF THE INVENTION

The present push-pull connector includes a pair of elongate, telescopically slidable male and female connector members each provided with an annular recess or groove. An interlocking member is employed to physically latch or interlock the slidable connector members together when one is pushed into the other and, preferably, this locking member also provides an effective seal for the fluids or other materials carried by the system in which the connector is being used. To create the interlock, the locking member, which may be annular or ring-shaped, is carried by one of the connector members, such as the female member in a radially and axially fixed position, the locking member itself including an elongate leg portion resiliently biased in a radial direction from its fixed position into the longitudinal plane of the recess of the other member, which in this instance would be the male member. When the connector members are pushed together an appropriate amount, the elongate leg portion resiliently snaps into the recess of this other male member so as to engage a wall of the recess and latch the two connector members against separation.

When the conduit system is operating, line fluid pressure produces a force which tends to separate the two connector members. Also, the connection frequently is subjected to mechanical separation forces. The elongate leg not only resists these separation forces but is formed in a special manner to significantly increase its locking strength as well as assure the interlock against separation by vibration or other external forces. In particular, the elongate leg portion is in the general form of a parallelogram that is so shaped, positioned and biased as to project about one-half of its bulk into engagement with its receiving recess. As a result, compression of the parallelogram produced by the forces which tend to separate the two members act in shear substantially along the diagonal of the parallelogram which, as will be appreciated, contains the maximum bulk of the interlocking leg member so as to assure the maximum resistance to shear. Separation of the interlocked members is accomplished by a disconnect ring carried by the connector and slidable relatively to the interlocked connector members to privotally cam the elongate leg of the annular locking member out of its engaged position. The recess of the connector member which carries the locking member is shaped to receive the elongate leg while the connector members are being separated. Preferably, the connector ring is mounted in the recess of the member with which the elongate leg is engaged prior to separation. Further, the ring is slidably movable in an axial direction in this recess and it abuts one end of the recess so that, when the recess member is moved toward the other member the ring is forcefully moved into its camming engagement with the elongate leg of the locking member. In this preferred form, the movement of the connector members one toward the other is controlled so as to first permit a limited movement of the members into the interlocking position and then subsequently permit further movement one toward the other to accomplish the unlatching or disconnect function provided by the disconnect ring. Mounting of the disconnect ring in the recess is quite advantageous since it greatly simplifies the disconnect operation and also simplifies the structure of the connector as a whole.

OBJECTS OF THE INVENTION

It is therefore an object of the present invention to provide an unusually simple and inexpensive push-pull connector which may be quickly and easily connected and disconnected.

Another object is to provide a push-pull connector capable of resisting extreme environmental and fluid line pressure variations and, related to this object, to provide a connector which will resist to a maximum extent the shearing of the packing used to interlock the telescopically connected members.

A further object is to provide a push-pull connector in which line pressure may vary from a low vacuum to a high positive line pressure without leakage.

Another object is to provide a push-pull connector that resiliently functions as a shock absorber for absorbing peak line surges.

A further important object is to provide a push-pull connector of a type using a resilient packing to provide the interlocking action, this packing also providing a self-sufficient seal for the interlocked members, both the sealing and the interlocking action of the packing being significantly increased relative to comparable prior art arrangements.

Still another object is to provide a quickly and easily operated connector adapted for use in electrical systems which must be carefully sealed from environmental fluids, gases, moistures and the like.

Yet another object is to provide a push-pull connector in which the male and female elements can be connected by pushing them one toward the other and, when connected, can be relatively rotated without disturbing the interlock or the seal.

Another object is to provide a push-pull connector in which the connector members are telescopically slidable one over the other, the sliding movement of these members being guided and stabilized to ease the connect and disconnect functions.

Other objects and their attendant advantages will become more apparent in the detailed description.

DESCRIPTION OF THE DRAWINGS

The present push-pull connector is illustrated in the accompanying drawings of which.

DETAILED DESCRIPTION OF THE PREFERRED EMBODIMENTS

Figures 1, 4, 5:
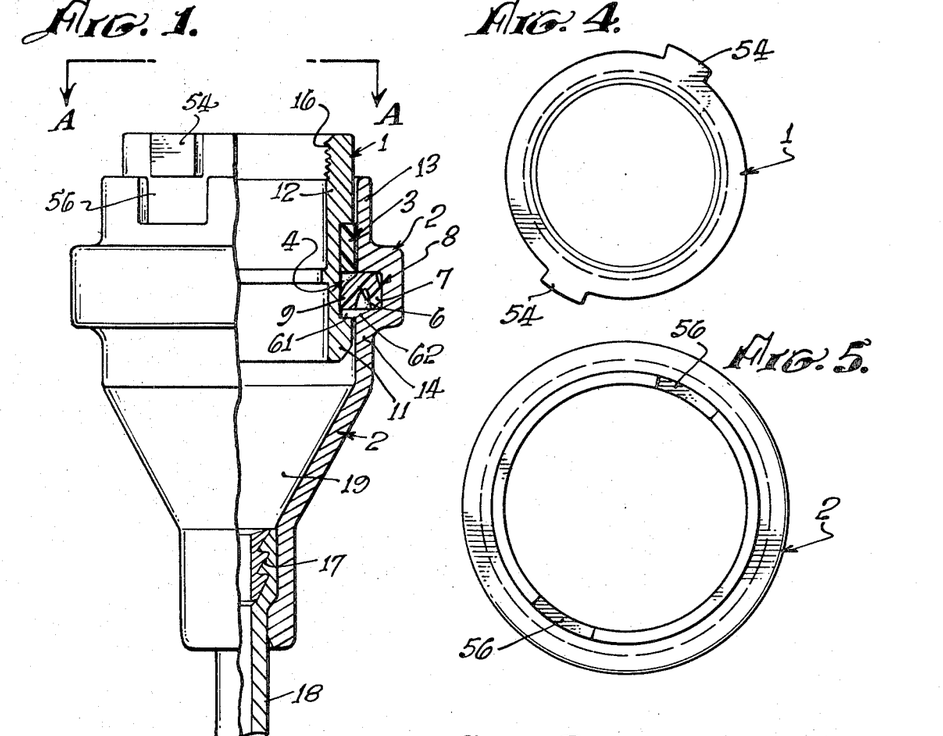
FIG. 1 is a side elevation with about a one-quarter sectional cutaway illustrating the interior assembly and interlationship of the connector elements.
FIG. 4 is an end view of the male connector member viewed downwardly in the direction of arrows A—A of FIG. 1.
FIG. 5 is an end view similar to FIG. 4 of the female connector member.

FIG. 1 illustrates a push-pull connector of the type presently being considered, this connector including male and female connector members 1 and 2, a slidable disconnect ring 3 positioned in a recess or groove 4 formed in the peripheral surface of male member 1 and a resilient, annular locking and sealing member 6 having a base portion 7 secured in a recess 8 formed in bore surface of sealing member 2, this lock-seal member also having an elongate leg portion 9 projecting radially into recess 4 of the male member. To facilitate subsequent description, it may be noted that recess 4 divides male member 1 into a head portion 11 and a body portion 12, while recess 8 divides the female member into a head portion 13 and a body portion 14.

To couple the connector to its conduit system, member 1 may be provided with threads 16 which might directly engage a threaded faucet while female member 2 has threads 17 engaging a conduit 18. The particular connector shown in FIG. 1 is intended as a quick connect-disconnect arrangement for coupling a jet-spray dental cleansing device to a water faucet and it is for this purpose that the female member is designed with a relatively large chamber 19 in which a water soluble dental tablet can be placed so that the water flow will pick up the cleanser and apply it through the jet sprays. However, as will be apparent, connectors similar to FIG. 1 and embodying the principles which will be described can be used for a great variety of applications. For example, it will be found particularly suitable for electrical systems or for fluid systems handling unusually high line pressures.

The specific materials from which the connector elements can be fabricated are not especially critical and, as related to the purposes of the present invention, they can vary in accordance with the particular situation. As contemplated, the male and female members can be made of a durable plastic resistant to environmental deterioration or, if desired, metals or other materials could be substituted. The selection of the material for locking member 6 should consider its functional requirements such as anticipated loading, line pressures and surges, and the environmental conditions to which it may be subjected. The higher the durometer for a given material the higher will be the resistance to permanent deformity and resistance to shear. For example, and 80 durometer nitrile base compound might be found to shear at 850 psi, whereas a 65 durometer for the same connector will shear at a lower line pressure. This material also should be resilient to provide the necessary sealing action and it should be sufficiently rigid and strong to provide the desired interlock of the male and female connector members. Various well-known commercial rubbers and plastic compositions will be found suitable.

Figure 2:
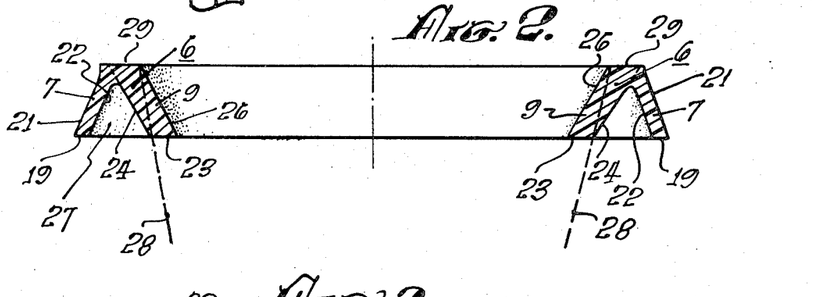
FIG. 2 is an enlarged sectional view of the resilient locking member of the connector.

Continuing with the description, the particular components which already have been identified should be considered in greater detail. Thus, as best shown in FIG. 2, base 7 of U-shaped, annular locking member 6 is formed as a leg of the U, the leg having an end wall 19 and inner and outer side walls 21 and 22 respectively. Similarly, elongate leg portion 9 has an end wall 23 and inner and outer side walls 24 and 26. The space between the U-shaped legs of this locking member is identified by numeral 27, this space being a functional element of the invention in a manner which will be described. With regard to leg 9, it also should be noted that if its side wall 24 is continued in the form of the dotted line shown in FIG. 2, this leg forms a parallelogram which has a diagonal illustrated by a dotted line 28. When so considered it will be seen that base 7 and leg 9 have what will be identified as a common end wall 29.

Figures 6, 7, 8, 9, 10:
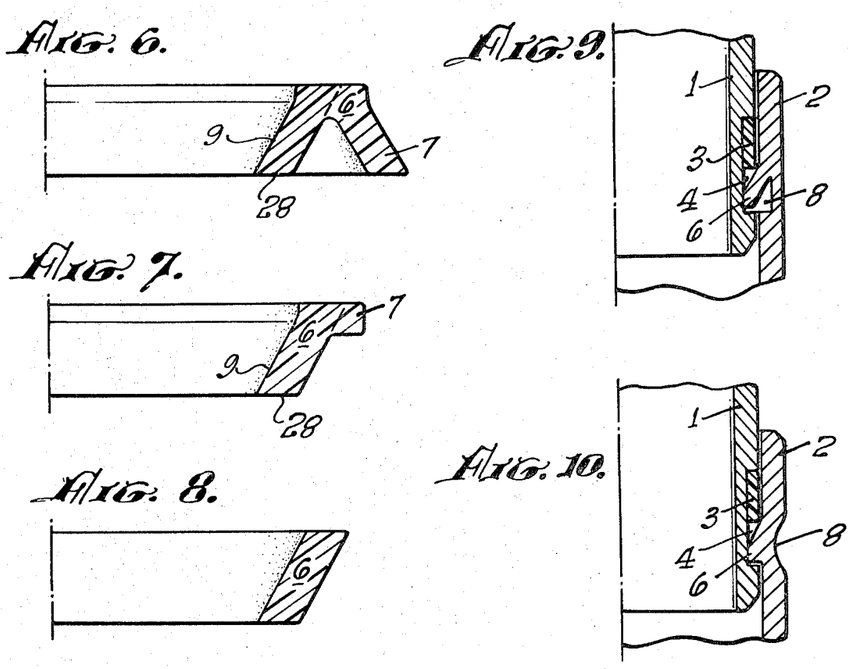
FIGS. 6, 7 and 8 are partial cross sectional enlargements illustrating various forms of the resilient locking member.
FIGS. 9 and 10 are fragmentary views illustrating the use of the locking member shown in FIG. 8.

Leg 9, as shown in FIG. 2, has what can be called an asymmetrical shape in that elongate leg 9 is substantially thicker than base 7. Other forms of the locking member can be employed, these forms being illustrated in FIGS. 6, 7 and 8. FIG. 6 is somewhat similar to FIG. 2 except that it has a bisymmetrical shape. FIG. 7 departs from the U-shape in that it has a base 7 in the form of a radially extending flange. When this embodiment is used, it will be obvious that the recess in which it is physically secured should be specially shaped to closely receive its flanged base portion. The embodiment of FIG. 8 has no base portion 7 and instead simply is a parallel leg portion 9 which must be adhesively secured in its recess or formed integrally in a manner which is illustrated in FIGS. 9 and 10 subsequently to be considered.

Figure 3:
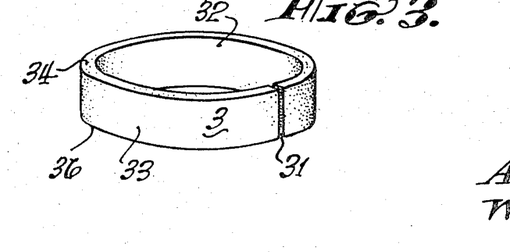
FIG. 3 is a perspective view of the disconnect ring of the connector.

Disconnect ring 3 is shown most clearly in FIG. 3 where it will be seen that it is a split ring having a gap 31 and, further, that the ring has an interior side wall 32, and exterior side wall 3 and end walls 34 and 36. Most suitably, ring 3 is mounted in recess 4 of male member 1 (FIG. 1), it being noted at this point that, as illustrated in FIG. 14-19, this recess 4 can be provided in the female member in which case, of course, disconnect ring 3 is carried by the female member. Recess 4, as shown, is a relatively shallow but longitudinally elongate recess having an inner wall 37 and end walls 38 and 39, these walls, for purposes of clarity, being identified in FIG. 11. It also can be noted at this point that the longitudinal length of recess 4 is sufficient to receive ring 3 as well as the elongate leg 9 of the locking member in a side by side disposition. Most suitably, the length of this recess along its inner wall 37 is about equal to the width of side wall 33 of the ring pulse the length of diagonal 28 of leg portion 9. However, if desired, the length of this recess can be slightly less than the combined lengths of these two elements providing, of course, it is sufficiently long to receive the members in their side by side relationship. Also, if desired, the length of the recess can be substantially longer than the combined length of the two elements so as to provide an intermediate space which might be desirable in situation where substantial contraction or expansion of the connected conduit members can be anticipated.

Figure 11:
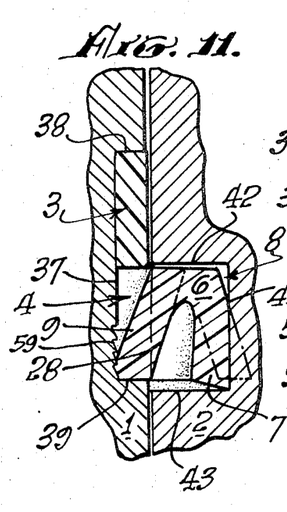
FIGS. 11–13 are enlarged, somewhat diagrammatical sectional views functionally illustrating the locking and sealing actions, these three views progressively showing the initial interlocking of the connecting members, a subsequent compression of the members and a final unlocking or separation step.

Recess 8, as shown in FIG. 11, is formed in female member 2 and, in a manner similar to recess 4, has an inner wall 4 and end walls 42 and 43. The length of inner wall 41 essentially is equal to the axial length of base 7, while the depth of the recess as measured along its end wall 42 should be at least as great as common end wall 29 of the annular locking member.

Other features of the invention probably can be more readily understood by considering and identifying them in conjunction with a description of the intended operation of the push-pull connector. This intended operation is progressively illustrated in FIGS. 14-19, but before considering these figures, it should be noted that FIGS. 14-19 illustrate a special embodiment of the connector in which it is adapted especially for use as a garden hose connector and that, in this embodiment, the parts are reversed to the extent that the annular locking member has its base 7 mounted in a recess in the male member, its elongate leg 9 extending into recess 4 which is formed in the female member and which also receives disconnect ring 3.

Figure 12:
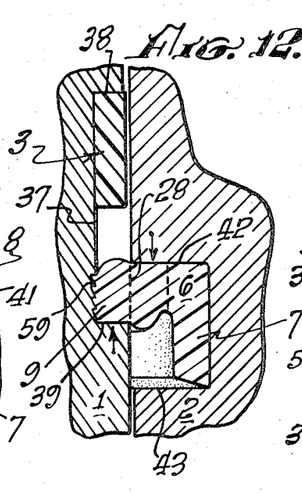
Figure 13:
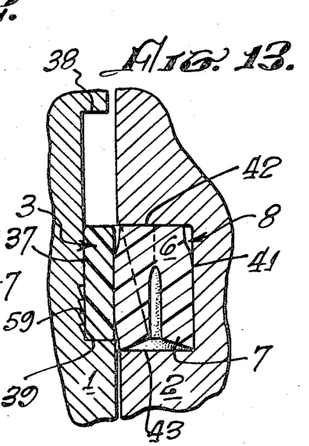
Figures 14, 15:
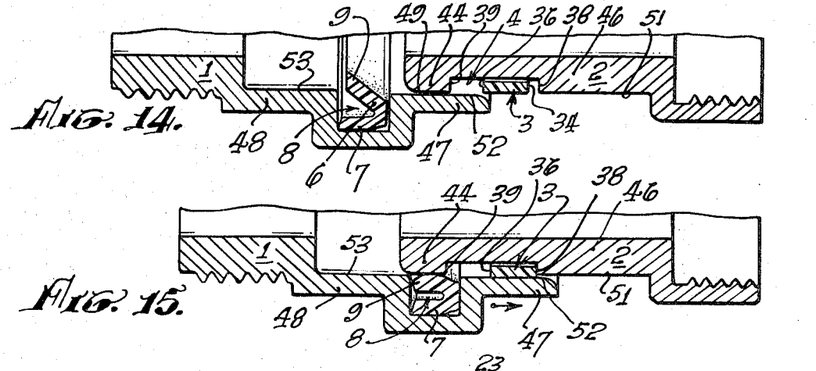
FIGS. 14–19 are progressive, sectional views of another embodiment of the invention illustrating the series of steps required to connect and disconnect the telescoping members.

Generally considered, this connector is of the push-pull type to the extent that it has telescopically slidable male and female members 1 and 2 adapted to be pushed or moved one into the other to permit leg 9 of annular locking member 6 to enter and engage in recess 4 to provide the interlock. This particular step of the operation is illustrated in FIGS. 12, 13 and 14. However, before considering these figures, it should be noted that recesses 4 and 8 divide their respective members into head and body portions 44-46 and 47-48. Portion 44 of the female member has a flat, circular bore wall 49 and, similarly, portion 46 of this member has a similar wall 51. These smooth surfaced walls of the female member telescopically mate with similar surfaces of the male member, these surfaces providing a peripheral surface 52 formed on its head portion and another surface or wall 53 formed on its body portion. Obviously, it is desirable that the telescopical movement of the male and female members be carefully guided and stabilized to a maximum extent. For this purpose, surface 49 can be formed with substantially the same diameter as surface 53 of the male member, while surface 51 of the female member has the same diameter as surface 52 of the male member. To facilitate the sliding movement and also prevent the members from catching one or the other as they are slid together or separated, it is preferred to dimension surface 49 with a slightly larger diameter than surface 51 and, of course, surfaces 52 and 53 are dimensioned accordingly.

Considering the progressive steps illustrated in FIGS. 14-19, FIG. 14 illustrates the initial step in making the connection, the head portion 47 of the male member having been engaged in the bore of the female member and partially moved toward an interlocked position. As seen, annular locking member 6 is carried in its normally biased position with its base engaged in recess 8 and its leg projecting radially at an inclined disposition out of the recess and into the longitudinal plane of the male member. Also, base 7 is radially and axially fixed in recess 8 with its walls 21 engaging inner wall 41 of the recess and its end walls engaging the recess end walls. The fact that the base is fixed in recess 8 causes it to act as a hinge for leg portion 9 to bias it radially a desired degree. In the illustrated position, its diagonal 28 (as shown in FIG. 2) is slightly inclined relative to the longitudinal axis of the mating members.

In FIG. 15, the connector members have been pushed further together causing head portion 44 of the male member to depress elongate leg 9 wholly into recess 8 of the female member. Also, head portion 47 of the male member frictionally engages disconnect ring 3 causing this ring to slide within the recess to a rearward position thus vacating the recess space ahead of the ring so that leg portion 9 can resiliently spring into this space when the two members are pushed further together in the manner illustrated in FIG. 16. The fact that ring 3 is a split ring as shown in FIG. 3 assures the frictional engagement needed to slide this ring to its rearward position. If desired, the locking member itself can be sized to contact the disconnect ring to assure its rearward movement.

Figure 16:
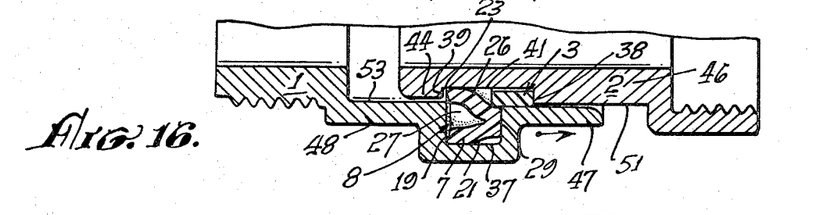

The FIG. 16 position can be considered as a so-called static position in which the interconnection does not subject it to line pressures or other compressive forces. However, even in this static position, annular locking member 6 provides an effective sealing member due to the fact that it is resiliently biased to force its side walls 21 and 26 tightly against inner walls 37 and 41 of the recesses. Also, as will be apparent by comparing FIG. 14 and FIG. 16, leg 9 of the annular locking member is compressed somewhat into its engaging position within recess 4 to accentuate the seal.

When line pressure is admitted through the connector, the sealing action of the locking member is very substantially increased. First, line fluid enters space 27 provided between the U-shaped legs of this member and this line pressure exerts its forces downwardly to force the legs even more tightly into their sealing engagement. Further, the line pressure tends to cause the male and female members to separate so that the end walls of the recesses tightly and sealably engage the end walls of the annular locking member.

Figure 17:
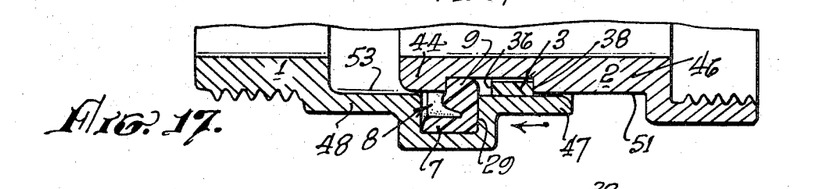

FIG. 17 illustrates the disposition of the various members when subjected to very substantial line pressure or to other external forces tending to separate the telescoping male and female members. As shown, annular leg 9 has been squeezed or compressed by the separating tendencies and the compressive forces again strengthen the seals as well as greatly increase the interlocking strength so as to assure the interlock even when the connected members are subjected to substantial vibration or other external forces. As shown in FIG. 17, the forces tending to separate the members have moved female member a substantial distance to the right so as to produce the compression of leg 9. In actual operation, it is apparent that the members can move relatively one with respect to the other to produce this compression. As will be described subsequently in greater detail, the particular manner in which leg 9 is compressed provides one of the significant features of the present invention.

Figure 18:
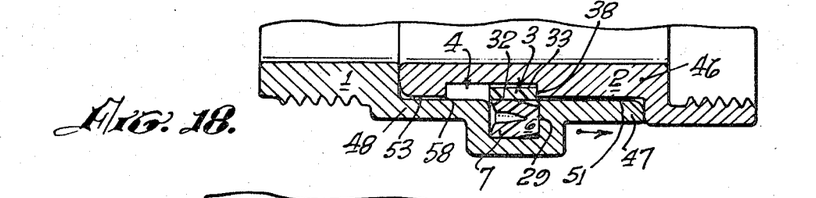
Figure 19:
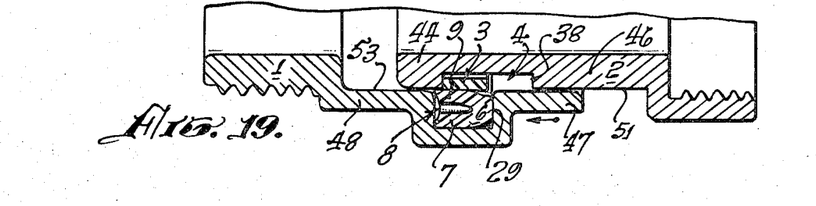

FIGS. 18 and 19 illustrate progressive steps used to disconnect the two members, it being apparent that the members first must be unlatched in order to permit their separation. Before the members are separated it will be understood that usually it will be desirable to return them to their so-called static disposition illustrated in FIG. 16 and, for this purpose, the line pressure can be bled off in any suitable manner. When the static position illustrated in FIG. 16 is established, the members are moved one toward the other sufficiently to cause disconnect ring to forcefully cam leg 9 out of recess 4 and wholly into recess 8 of the male member. As will be appreciated, disconnect ring 3 is engaged in its rearward position by end wall 38 of recess 4 so that, when the female member is moved from the static position forward the male member or when these two members are relatively moved one toward the other, disconnect ring is carried forwardly to engage and forcefully press leg 9 out of recess 4.

It, of course, is essential to provide an arrangement which permits the two members to be moved one toward the other from the so-called static position of FIG. 16 and, the manner in which this is accomplished is best shown in FIGS. 1, 4 and 5, although other arrangements accomplishing the same result certainly are contemplated. As shown in FIG. 1, one of the members such as male member 1 is formed with diametrically opposed key flanges 54, while female member 2 is provided with similar key slots 56. Initially, when the two connector members are moved together into the static position shown in FIG. 16, keys 54 prevent any further movement of these members one toward the other. However, when it is desired to separate the members, they can be relatively rotated so as to align flanges 54 with slots 56 and permit the keys to be moved into the slots as the members move further together. A very substantial advantage of this arrangement is that it permits the disconnect to be made simply by grasping one of the conduit members or its connector and with an initial rotation moving it toward the other member to unlatch the locking member. Following this simple thrusting movement the members can be pulled apart to accomplish the separation and the pulling motion accomplished, using the same grip for the thrust. If desired, appropriate means can be provided to assure that the key rotation does not occur accidentally although, since the tendency of the coupled members is to separate, such an accident is not likely.

FIG. 19, as shown by its arrow, illustrates the separating movement of the two members. If it is considered that male member 1 is being drawn out of female member 2 it will be apparent that, due to the tight frictional engagement of leg 9 of the locking member with disconnect ring 3, the ring will move with member 1 into what they may be called its forward position within slot or recess 3. One possible difficulty in accomplishing the separation is the fact that inner corner 58 of the female member (FIG. 18) hang-up or catch on the lip of leg 9 of the locking member. To prevent this from happening, it is desirable to dimension ring 3 so that its thickness between its side walls 32 and 33 (FIG. 3) is slightly greater than the depth of recess 4 so that the ring projects slightly out of the recess to depress leg 9 out of the path of corner 58. Also, due to the fact that the ring is a split ring, it can contract to accommodate any tendency to hang-up during separation and, of course, it again expands when in the other functional positions. Another functional advantage of the split ring which may not be too obvious is the fact that, when the parts initially are assembled, the ring can be expanded to slip over head portion 44 of the female member into its desired position within its recess 4. Also, it can be removed for cleaning purposes. However, it should be noted that the principal advantage gained by using a split ring is to achieve an increase in resiliency and, of course, this resiliency can be provided in other manners.

One significant features of the present invention is the particular shaping of leg 9 of the annular locking member and the advantages resulting from this shaping. As already explained, leg 9 is in the form of a parallelogram particularly when its shape includes the dotted line extension of wall 24 as shown in FIG. 2. Further, it has been noted that the parallelogram has a diagonal 28. The purpose of using the parallelogram is to achieve the maximum possible shear strength for leg 9 particularly when the leg is subjected to the compressive forces illustrated in FIGS. 12 and 17. The manner in which this is accomplished is best shown in FIGS. 11–13 where it will be seen that connector member 6 is so positioned, shaped and sized relative to the recesses in which it is mounted that, when leg 9 is in its interlocking position shown in FIG. 9 or 11 one half of the parallelogram projects into recess 4, while the other half remains within recess 8. Consequently, diagonal 28 of the parallelogram aligns with the shear forces produced by the compression, these shear forces obviously being along the plane in which the two connector members telescopically slide in their axial direction. Such being the case, when the compressive forces are applied, they act along the diagonal and squeeze leg 9 of the connector member into the position shown in FIG. 12 in which the diagonal of the parallelogram remains aligned with the shear line. The reason for the increased shear strength is due to the fact that the maximum bulk of leg 9 lies along its diagonal and, obviously, the shear strength increases with the bulk subjected to the shearing force.

FIG. 12 further illustrates another desirable feature obtained by shaping recess 4 with detents or teeth 59, these teeth taking a positive hold upon the engaged surface of leg 9 when the leg is subjected to its compressive forces. As will be appreciated, there may be a tendency for a portion of leg 9 which projects into recess 4 to creep upwardly into the empty space in the recess and this tendency is offset by the gripping action of teeth 59. FIG. 13 is somewhat similar to FIG. 19 although it illustrates in further detail the positioning of the members during the disconnect operation.

There are several additional features which have not been considered in the foregoing detailed description. First, with reference to FIG. 1, it will be noted that this embodiment employs the asymmetric locking member illustrated in enlarged form in FIG. 2. Since the size and strength of base 7 relative to leg 9 determines to some extent the manner in which leg 9 pivots or hinges, the asymmetric configuration makes it desirable to provide space within recess 4 for leg 9 to pivot from its static position as shown in FIG. 16 into its unlatched and depressed position shown in FIG. 18. More specifically, the asymmetric configuration causes leg 9 to swing in an arcuate direction so that it is desirable to provide for the arcuate swing by leaving space 61 (FIG. 1) available between the end of leg 9 and its adjacent end wall of recess 4. Further, wall 43 of recess 8 can be provided with an inclined portion 62 to accommodate this arcuate swing. The embodiment of the locking member illustrated in FIG. 7 also varies the engaging or pivotal action of its leg 9 and it may be found desirable to again provide for the arcuate swing of this leg in the manner shown in FIG. 1.

The embodiment of locking member 6 as shown in FIG. 8, in essence, omits the use of base 7 which is common to the other embodiments. Instead, this member is simply in parallelogram form and must be adhesively secured to the male or female member which is to carry it or, if desired, ti can be made integral with the connector member on which it is mounted in the manner shown in FIGS. 9 or 10. In FIG. 9, locking member 6 is carried by the female member and, as shown, is integrally formed with it. Its function remains the same as that of leg portion 9 described with reference to the other embodiments to the extent that it interlocks by springing into recess 4 and its permits separation of the members by being depressed by means of disconnect ring 3 into its groove 8 provided in this member. FIG. 10 is similar to FIG. 9 except that groove 8 is formed on the outside wall of female member 2 rather than in its bore. When disconnect ring forces locking member 6 outwardly, groove 8 sufficiently weakens the wall portion of female member to permit its bore to enlarge so as to receive the parallelogram locking leg. An arrangement of this type may sacrifice some of the sealing capacity achieved by the use of U-shaped locking member sand, since the material forming female connector 2 is the same as locking member 6, the resiliency of material may somewhat diminish the locking action. However, in applications which do not require unusually strong seals or interlocks, the use of the integrally formed locking member 6 as shown in FIGS. 9 and 10 substantially simplifies the entire structure and minimizes its expense. To increase the strength of locking member 6 as it is used in this integral embodiment or in other embodiments which have been described, it is possible to incorporate reinforcing materials within the resilient material from which the locking member is formed.

It is believed that the operation of the present connector has been clearly described particularly with reference to the progressive steps of FIGS. 14–19. Its advantages are substantial in that first it is capable of operating under optimum conditions of compression and expansion as well as vibration without damaging the locking element under shear. Further, the arrangement permits excessive forces to be resisted for unusually long periods of time without producing cold flow or permanent deformation. Also, the arrangement is such that the locking member readily can be replaced, cleaned or otherwise maintained as occasion may require. In particular, the arrangement utilizing the disconnect ring slidably mounted within the recess that receives the locking member permits substantial simplifications and consequent significant reductions in the expense of the fabrication. Use of the connector is greatly facilitated by the stability of its telescopic sliding action and also by the fact that it can be connected simply by grasping one of the members and pushing it toward the other other. To disconnect, the same member can be grasped and, with a slight rotation, thrust and pull the members easily can be pulled apart. Reduction of expense as well as the ease in handling represents a considerable advance in that it enables a connector of this type to be used for household appliances and in other applications which demand simple and inexpensive arrangements to promote their widespread use.

Obviously many modifications and variations of the present invention are possible in the light of the above teachings. It is therefore to be understood that within the scope of the appended claims the invention may be practiced otherwise than as specifically described.

We claim:

1. Push-pull connector apparatus for releasably coupling together a pair of conduit sections comprising:

elongate telescopically-slidable male and female connector members adapted to engage one with one of said sections and the other with the other section, an annular peripheral recess formed in each of said members, each recess having an inner wall and end walls, an annular locking member carried by one of said connector members in a radially and axially fixed position, said locking member including an elongate leg portion resiliently biased into a contracted disposition in which it projects radially from its fixed position on said one connector member into the longitudinal plane of the recess of the other connector member said inner wall of said recess of said other connector member having a substantially constant diameter through its entire axial length, wherein when said connector members are moved a fixed distance one toward the other said recesses align to permit said leg portion to resiliently move into said recess of said other connector member, said leg portion then being disposed for engaging one of said recess end walls of said other connector member to provide an interlock compressibly resisting forces tending to separate said connector members, and a disconnect ring having a constant cross-section and being slidably mounted wholly within said leg-receiving recess, said ring having a rear wall slidably engaging the inner wall of said recess and a pair of side walls one of which is disposed axially adjacent to said interlocking leg portion of the locking member and the other disposed for engagement with the other end wall of said recess when said connector members are moved toward the other said recess of said other connector member having its entire axial length disposed concentrically within said one connector member when said connector members are disposed in their interlocked position, said connector members being movable beyond said fixed distance one toward the other whereupon said disconnect ring moves into engagement with said interlocking leg portion for camming said portion out of its interlocking disposition and permitting said connector members to be separated, said ring maintaining said cammed engagement during said separation.

2. The connector of claim 1 wherein said elongate leg portion is an integral part of one of said connector members.

3. The connector of claim 1 wherein said annular locking member is U-shaped with its base portion forming a second leg of said U, said legs having a common end portion disposed wholly within one of said recesses and said legs further being generally parallel to the longitudinal axis of the connector members and lying wholly within said one recess when said disconnect ring has moved said elongate leg out of its contracted interlocked position into an expanded position.

4. The connector of claim 3 wherein said U-shaped locking member is formed to sealably engage said inner and end walls of said recesses when said elongate leg portion is in its contracted uncompressed disposition.

5. The connector of claim 1 wherein said connector members are formed with annular mating surfaces upon which said members are telescopically slidable, said annular mating surfaces permitting relative rotation of said connector members when said members are in their interlocked position.

6. The connector of claim 5 further including:

means restraining further movement of said connector members on one toward the other when said members have been moved said fixed distance, and means for releasing said restraining means whereby said interlocked members, are movable one toward the other beyond said fixed distance, said movement carrying said disconnect ring into a camming engagement with said resiliently-based leg portion of the locking member for forcing said leg portion out of its contracted position into its expanded position whereupon said connector members can be separated.

7. The connector of claim 6 wherein said disconnect ring is formed with a thickness slightly greater than the depth of its ring-receiving recess wherein said ring cams said leg portion of the locking member into a recessed disposition in the other recess for facilitating subsequent separation of the connector members.

8. The connector of claim 6 wherein said means for releasing said restraining means and for separating said interlocked connector members is provided for forming one of said connector members with a key and the other with a slot whereby said connector members can be rotated on said annular mating surfaces to align said key with said slot whereupon said members can be moved beyond said fixed distance one toward the other by moving said key into said slot.

9. The connector of claim 5 wherein said recesses divide each of said connector members into head and body portions, said head portions of each having annular surfaces telescopically mating with annular surfaces formed on the body portions of the other, for guiding and stabilizing the telescopic movement of said connector members and the annular head and body surfaces of each of the members having varying radii for facilitating the separation of said members.

10. The connector of claim 1 wherein said elongate leg portion is in the general form of a parallelogram and is so shaped, positioned and biased as to project about one-half of said parallelogram into interlocking engagement in said other recess whereby compression of said parallelogram produced by forces tending to separate said connector members acts in shear substantially along the diagonal of the parallelogram.

11. The connector of claim 8 wherein said elongate leg portion is in the general form of a parallelogram and is so shaped, positioned and biased as to project about one-half of said parallelogram into interlocking engagement in said other recess whereby compression of said parallelogram produced by forces tending to separate said connector members acts in shear substantially along the diagonal of the parallelogram.

12. The connector of claim 9 wherein said elongate leg portion is in the general form of a parallelogram and is so shaped, positioned and biased as to project about one-half of said parallelogram into interlocking engagement in said other recess whereby compression of said parallelogram produced by forces tending to separate said connector members acts in shear substantially along the diagonal of the parallelogram.

* * * * *

UNITED STATES PATENT OFFICE
CERTIFICATE OF CORRECTION

Patent No. 3,731,955    Dated May 8, 1973

Inventor(s) Adolph W. Borsum et al.

It is certified that error appears in the above-identified patent and that said Letters Patent are hereby corrected as shown below:

Column 1, before "BACKGROUND OF THE INVENTION" insert the following:

The invention described herein may be manufactured and used by or for the Government of the United States of America for governmental purposes without the payment of any royalties thereon or therefor.

Signed and sealed this 12th day of February 1974.

(SEAL)
Attest:

EDWARD M. FLETCHER, JR.　　　　　C. MARSHALL DANN
Attesting Officer　　　　　　　　Commissioner of Patents